United States Patent [19]

Brandman et al.

[11] Patent Number: 5,239,574
[45] Date of Patent: Aug. 24, 1993

[54] METHODS AND APPARATUS FOR DETECTING VOICE INFORMATION IN TELEPHONE-TYPE SIGNALS

[75] Inventors: Yigal Brandman, Palo Alto; Manoj Puri, Sunnyvale, both of Calif.

[73] Assignee: Octel Communications Corporation, Milpitas, Calif.

[21] Appl. No.: 625,369

[22] Filed: Dec. 11, 1990

[51] Int. Cl.⁵ .................... H04M 1/54; H04M 3/42
[52] U.S. Cl. .......................... 379/88; 379/67; 379/80; 379/351; 379/1
[58] Field of Search .............. 379/67, 88, 80, 351, 379/1, 4; 395/2

[56] References Cited

U.S. PATENT DOCUMENTS

| | | | |
|---|---|---|---|
| 4,426,730 | 1/1984 | Lajotte et al. | 395/2 |
| 4,485,486 | 11/1984 | Webb et al. | 379/60 |
| 4,677,663 | 6/1987 | Szlam | 379/387 |

Primary Examiner—James L. Dwyer
Assistant Examiner—Fan Tsang
Attorney, Agent, or Firm—Robert R. Jackson; G. Victor Treyz

[57] ABSTRACT

Voice signal information in a telephone-type signal is detected by subjecting the signal to several tests such as a minimum energy test, an amplitude ratio test, and a sequencing test which ensures that the other tests have been satisfied for a sufficient length of time and/or sufficiently frequently over a predetermined time interval. A voice processing system such as a voice mail system may use the detection of voice as above to initiate the transmission of an announcement or message during an automatically placed telephone call.

15 Claims, 5 Drawing Sheets

$$E = \sum_{16ms} x^2$$

$$R = \frac{x^2_{max}}{\left(\sum_{16ms} x^2\right)/128}$$

METHODS AND APPARATUS FOR DETECTING VOICE INFORMATION IN TELEPHONE-TYPE SIGNALS

BACKGROUND OF THE INVENTION

This invention relates to voice communication systems, and more particularly to methods and apparatus for detecting the occurrence of voice information in a telephone-type signal.

Automated voice messaging systems sometimes require the ability to automatically place a telephone call, and when that call is answered, to transmit a previously recorded message to the person answering the call. For example, a voice processing system such as a voice mail system may receive and record messages for a subscriber or user at any time during the day. At some predetermined subsequent time convenient for the user, if any messages have been received, the system may call that user to tell him or her that messages have been received and to play back those messages if the user elects to hear them. For example, when the automatically placed call is answered, the system may first transmit a prerecorded standard announcement identifying the system to the user and stating that the user has a specified number of new messages which can be audited. The user then operates the buttons on his or her DTMF ("Touch-Tone") telephone to tell the system whether or not to play the messages and/or to cause the system to perform other tasks.

A problem with such systems is to enable the system to know when to begin transmitting the initial announcement after the automatically placed call has been answered. Prior systems have begun the initial announcement a predetermined time interval after the system detects that the ringing signal has stopped. This is a relatively imprecise and unsatisfactory way to commence the announcement. For example, if the call is answered immediately after a ring and the person answering moves the telephone handset quickly to his or her ear, there may be a disconcertingly long silence before the initial announcement begins. On the other hand, if the call is answered just before a ring would otherwise have occurred and the person answering moves the handset relatively slowly to his or her ear, the initial announcement may begin before the person answering can hear it.

A better technique would be for the system to begin the initial announcement after detecting that the person answering the call has spoken (e.g., said "hello") into his or her handset.

Accordingly, it is an object of this invention to improve voice communication systems of the type which automatically place a telephone call and make a voice announcement after that call is answered by causing such systems to detect a voice response to the call and to begin the voice announcement after that voice response has been detected.

The signals on telephone lines are often quite complex and noisy, and it can therefore be difficult to determine whether or not such a signal includes voice information.

It is therefore another object of this invention to provide improved methods and apparatus for determining whether or not the signal on a telephone line includes voice information.

SUMMARY OF THE INVENTION

These and other objects of the invention are accomplished in accordance with the principles of the invention by providing, in a voice communication system of the type which automatically places a telephone call in order to make a voice announcement after the call is answered, means for monitoring the signal on the telephone line in order to detect a voice-type component in that signal, and means for initiating the voice announcement after an acceptable voice-type signal component has been detected. The improved voice detection methods and apparatus of this invention subject the telephone signal to a plurality of tests, all of which must be satisfied in order for the signal to be recognized as having a voice component. The signal must have at least a predetermined minimum amount of energy during a predetermined time interval. In addition, a quantity proportional to the ratio of the square of the maximum value of signal amplitude during the predetermined time interval to the average of the squared amplitude values during that time interval must exceed a predetermined threshold ratio value. Finally, both of the foregoing tests must be satisfied for a predetermined number of adjacent time intervals, e.g., at least two of four consecutive time intervals.

Further features of the invention, its nature and various advantages will be more apparent from the accompanying drawings and the following detailed description of the preferred embodiments.

DETAILED DESCRIPTION OF THE PREFERRED EMBODIMENTS

Although the invention is applicable to other types of voice communication, the invention will be fully understood from the following explanation of its application to voice mail or voice processing systems.

Figure 1:
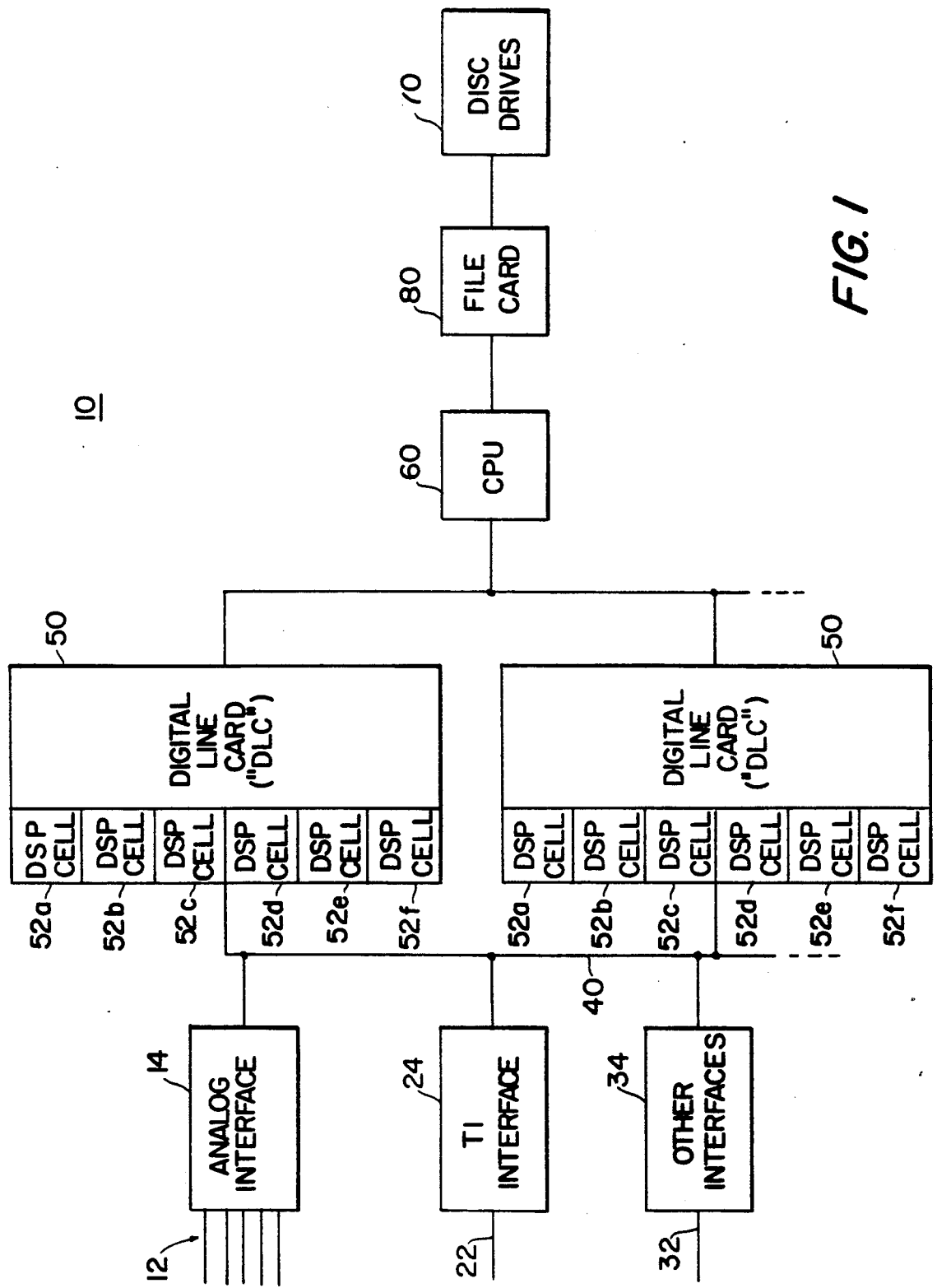
FIG. 1 is a block diagram of an illustrative voice processing system in which the present invention can be implemented and employed.

An illustrative voice processing system 10 in which this invention can be used is shown in FIG. 1. A plurality of analog telephone lines 12 are connected to conventional analog interface device 14. This device converts the analog signal on each active line 12 to pulse code modulation ("PCM") digital signals on PCM bus 40. Conventional T1 interface device 24 performs a similar function with respect to the digital ("T1") signal on digital telephone line 22. Other conventional interface devices 34 perform similar functions with respect to other telephone line inputs 32.

The signals on PCM bus 40 are distributed to the digital signal processor ("DSP") portions 52a-f of one or more digital line cards ("DLCs") 50. Each DLC 40 includes six DSP cells 52a-f and a microprocessor such as a model 386 microprocessor available from Intel Corporation of Santa Clara, Calif. Each DSP cell can handle the data from two analog telephone lines and includes a microprocessor such as a model TMS320C25 microprocessor available from Texas Instruments Incorporated of Houston, Tex.

Overall system control is provided by central processing unit ("CPU") 60. CPU 60 may include a suitably programmed microprocessor such as an Intel model 386 microprocessor. CPU 60 is supported by one or more conventional disc drives 70 and conventional file card 80. Disc drives 70 are the mass memory for the system (e.g., the ultimate repository of the voice messages left on the system). File card 80 controls disc drives 70, including such functions as which disc is to be used, disc redundancy, etc.

The flow of much of the information in the above-described elements is, of course, bidirectional. Thus analog interface device 14, for example, not only converts incoming analog telephone signals to incoming digital signals on bus 40, but also converts outgoing digital signals on bus 40 to outgoing analog signals on the appropriate ones of analog lines 12. Similarly, DLCs 50 (including DSPs 52) appropriately pass voice information and other data in both directions between bus 40 and CPU 60. CPU 60 acts similarly with respect to the passage of voice information and other data in both directions between elements 50, on the one hand, and elements 70 and 80, on the other hand.

The voice detection process of this invention is performed in each DSP cell 52. In particular, this process is performed by the above-identified microprocessor in each cell 52. Accordingly, some functions performed by this microprocessor (and closely related functions performed by representative interface device 14) are shown in more detail in FIG. 2, which will now be described.

Figures 2, 3, 4:
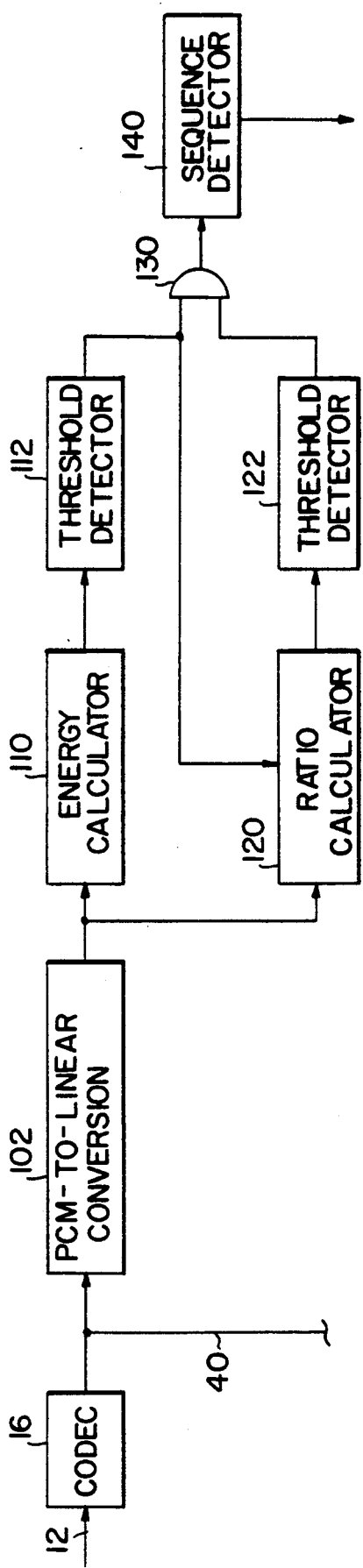
FIG. 2 is a more detailed block diagram of an illustrative embodiment of a portion of the apparatus of FIG. 1 in accordance with this invention.
FIGS. 3 and 4, are equations for computations performed in the apparatus of FIGS. 1 and 2 in accordance with this invention.

As shown in FIG. 2, analog interface device 14 includes a coder/decoder ("CODEC") 16 for each analog line 12. CODEC 16 produces PCM samples of the analog input signal at 8 KHz. The DSP cell 52 to which these PCM signals are applied (more particularly, the microprocessor of that DSP cell) performs a PCM-to-linear conversion 102 to convert the applied PCM data to linear binary data. This linear binary data is made available to both energy calculator 110 and ratio calculator 120, although ratio calculator 120 is only operative if enabled by the output signal of threshold detector 112 as discussed below.

Energy calculator 110 computes the amount of signal energy represented by the applied data for each successive 16 millisecond ("ms") time interval. For example, energy calculator 110 may perform the computation represented by the equation in FIG. 3, where x is the value of each signal sample applied to energy calculator 110. The energy value E computed by energy calculator 110 is applied to threshold detector 112 which compares the computed energy value to a predetermined minimum energy value and produces an output signal for enabling ratio calculator 120 and AND gate 130 if and only if the computed energy value exceeds the minimum energy value. The minimum energy value is selected so that signals containing voice or other meaningful information will have more than that minimum amount of energy, but so that mere noise signals will typically not contain that much energy.

If in any 16 millisecond time interval the signal contains at least the predetermined minimum amount of energy, then ratio calculator 120 is enabled to perform its calculation on the signal samples for that time interval. Ratio calculator 120 computes the ratio between the square of the largest sample in the 16 millisecond time interval to the average of the squares of all the samples in that interval. For example, ratio calculator 120 may perform the computation represented by the equation in FIG. 4, where the numerator is the square of the largest sample in each 16 millisecond time interval, and the denominator is the value E (computed as shown in FIG. 3) divided by 128 (the number of samples in 16 milliseconds). The ratio value R computed by ratio calculator 120 is applied to threshold detector 122 which produces an output signal for enabling AND gate 130 if and only if R exceeds a predetermined minimum ratio value. This minimum ratio value is selected so that all telephony signals other than speech typically do not exceed this minimum ratio but so that speech typically does exceed this minimum ratio. This distinction is possible because telephony signals other than speech are fairly uniform for fairly long periods of time. Only speech has large, frequently occurring amplitude changes, and therefore only speech is likely to produce relatively large values of R.

When both the minimum energy test (performed by elements 110 and 112) and the ratio test (performed by elements 120 and 122) are satisfied for a given 16 millisecond time interval, AND gate 130 is fully enabled and therefore applies to sequence detector 140 a signal indicating that both of these tests have been satisfied. Sequence detector 140 produces an output signal indicating that voice signal information has been detected as soon as it has received the above-mentioned AND gate output signal during at least a predetermined number of 16 millisecond time intervals in a predetermined test time period. For example, sequence detector 140 may produce the voice detection output signal when it has received the above-mentioned AND gate output signal during at least two of four consecutive 16 millisecond time intervals. The voice detection output signal of sequence detector 140 can be used for any purpose for which a voice detection signal is needed. For example, in the illustrative application mentioned in the background section of this disclosure, the voice detection output signal of sequence detector 140 can be used to initiate transmission of a voice announcement by the voice processing system.

Figure 5A:
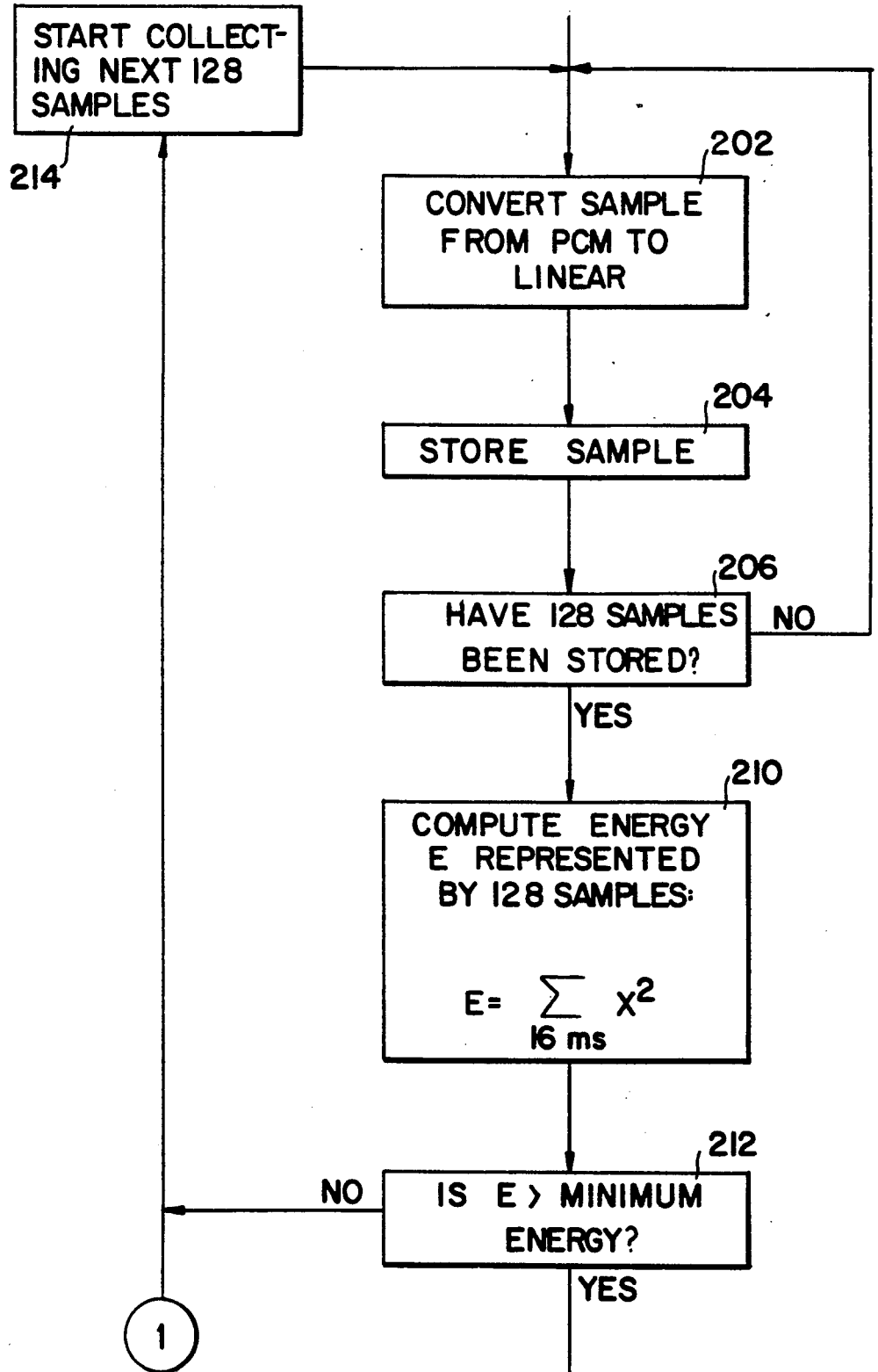
FIG. 5 (comprising parts 5a and 5b) is a flow chart of an illustrative embodiment of the method of this invention which can be carried out in the apparatus of FIGS. 1 and 2.
Figure 5B:
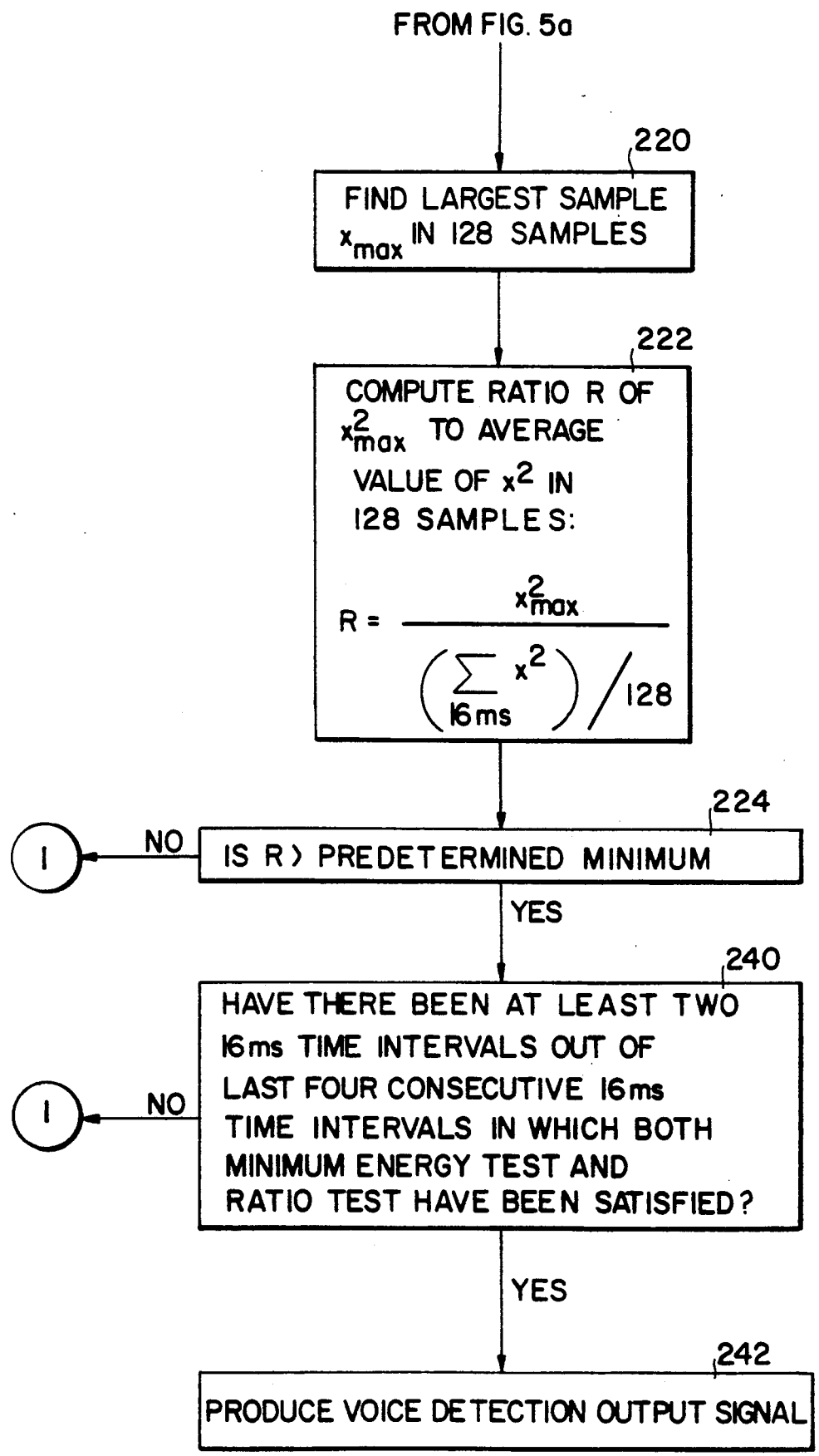

Although separate structural elements are shown in FIG. 2, it will be understood that elements 102, 110, 112, 120, 122, 130, and 140 can all be implemented by means of a suitably programmed general-purpose microprocessor, and that this is indeed the case in the preferred embodiment. FIG. 5 is a flow chart of the steps which can be carried out in such a microprocessor in accordance with this invention.

In step 202 each signal sample from CODEC 16 (FIG. 2) is converted from PCM to linear form. In step 204 the sample is stored. In step 206 a determination is made as to whether or not 128 samples have been stored. If not, the accumulation of samples continues. If so, control passes to step 210.

In step 210 the energy E represented by the stored 128 samples is computed as shown. In step 212 E is compared to the predetermined minimum energy value. If E is less than the predetermined minimum, control passes to step 214 which begins the process of accumulating the next 128 samples. If E is greater than the predetermined minimum, then control passes to step 220 which begins performance of the ratio test.

In step 220 the largest of the 128 samples is identified. In step 222 the ratio R is computed as shown. In step 224 R is compared to a predetermined minimum value. If R is less than this minimum, control passes to step 214 which begins the accumulation of the next 128 samples. If R is greater than the predetermined minimum, then control passes to step 240 which performs the sequence test.

In step 240 a determination is made as to whether or not the minimum energy and ratio tests have both been satisfied during at least two of the last four consecutive 16 millisecond time intervals. If not, control passes to step 214 where accumulation of the next 128 samples begins. If so, control passes to step 242 in which the voice detection output signal is produced.

Figure 6:
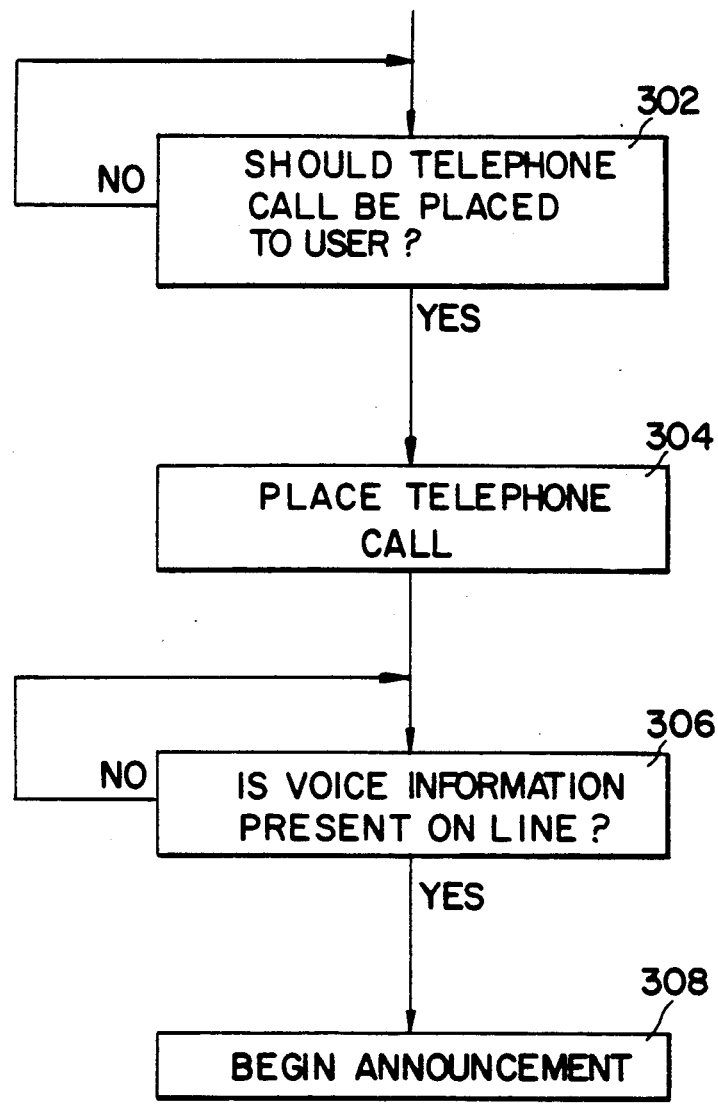
FIG. 6 is another flow chart of an illustrative embodiment of the method of this invention which can be carried out in the apparatus of FIG. 1.

FIG. 6 shows an illustrative use of the invention in a voice processing system such as a voice mail system. In step 302 the system decides whether or not to place a telephone call to a user of the system based on criteria which are not part of this invention. If appropriate, the telephone call is placed in step 304. As soon as the call is placed, the system begins (in step 306) to monitor the signal on the telephone line for voice signal information as shown in more detail in the other FIGS. As soon as the voice detection output signal is produced (e.g., by sequence detector 140 in FIG. 2 or step 242 in FIG. 5), control passes to step 308 which initiates transmission of an appropriate prerecorded announcement.

It will be understood that the foregoing is merely illustrative of the principles of this invention and that various modifications can be made by those skilled in the art without departing from the scope and spirit of the invention. For example, although 16 millisecond time intervals are employed in the preferred embodiment, it will be understood that intervals of other lengths could be used if desired. Similarly, although in the preferred embodiment the sequence test involves determining whether or not the other tests have been satisfied for at least two of the last four consecutive 16 millisecond time intervals, it will be understood that different sequence test parameters could be chosen if desired (e.g. at least two out of five consecutive time intervals, or at least three out of five consecutive time intervals).

The invention claimed is:

1. In a voice processing system including means for automatically placing a telephone call to a user of the system and making a prerecorded announcement when that call is answered, the improvement comprising:
   means for detecting voice signal information on the telephone line on which the call has been placed; and
   means for initiating the prerecorded announcement when said voice signal information is detected, said means for detecting comprising:
   means for periodically sampling the signal on said telephone line;
   means for identifying the largest sample in a predetermined number of adjacent samples;
   means for comparing the energy of said largest sample to an energy value which is equal to the average of the energies of each of said predetermined number of adjacent samples by calculating the ratio of said energy of said largest sample to said energy value; and
   means for preventing operation of said means for initiating unless said means for comparing indicates that the ratio of said energy of said largest sample to said energy value is greater than a predetermined minimum ratio.

2. The apparatus defined in claim 1 wherein each successive predetermined number of adjacent samples comprises a group of samples, and wherein said means for preventing comprises:
   means for recording whether or not, for each of a plurality of successive groups of samples, said means for comparing indicates that said energy of said largest sample is sufficiently greater than said energy value; and
   means for allowing operation of said means for initiating only when said means for recording indicates that said energy of said largest sample is sufficiently greater than said energy value for at least a predetermined minimum number of groups in said plurality of successive groups of samples.

3. The apparatus defined in claim 1 wherein said means for detecting further comprises:
   means for measuring the energy in said predetermined number of adjacent samples, the result being a measured energy;
   further means for comparing said measured energy to a predetermined minimum energy; and
   further means for preventing operation of said means for initiating unless said further means for comparing indicates that said measured energy is greater than said predetermined minimum energy.

4. The apparatus defined in claim 3 wherein each successive predetermined number of adjacent samples comprises a group of samples, and wherein said apparatus further comprises:
   means for recording whether or not, for each of a plurality of successive groups of samples, said means for comparing indicates that said energy of said largest sample is sufficiently greater than said energy value and said further means for comparing indicates that said measured energy is greater than said predetermined minimum energy; and
   means for allowing operation of said means for initiating only when said means for recording indicates that said energy of said largest sample is sufficiently greater than said energy value and said measured energy is greater than said predetermined minimum energy for at least a predetermined minimum number of the groups in said plurality of successive groups of samples.

5. In a voice processing system including means for automatically placing a telephone call to a user of the system and making a prerecorded announcement when that call is answered, the improvement comprising:
   means for detecting voice signal information on the telephone line on which the call has been placed; and
   means for initiating the prerecorded announcement when said voice signal information is detected, said means for detecting comprising:
   means for periodically sampling the signal amplitude on said telephone line;
   means for identifying the largest sample in a predetermined number of adjacent samples;
   means for comparing the energy of said largest sample to an energy value which is equal to the average of the energies of each of said predetermined number of adjacent samples; and means for preventing operation of said means for initiating unless said means for comparing indicates that said energy of said largest sample is sufficiently greater than said energy value, said means for comparing comprising:
first means for computing the square of said amplitude of said largest sample;
second means for computing the average of the squares of said amplitudes of said predetermined number of adjacent samples; and
means for determining whether the ratio of the square of said amplitude of said largest sample to the average of the squares of said amplitudes of said predetermined number of adjacent samples is greater than a predetermined minimum ratio.

6. The method of operating a voice processing system which includes means for automatically placing a telephone call to a user of the system and making a prerecorded announcement when that call is answered, said method comprising the steps of:
monitoring the signal on the telephone line on which said call has been placed in order to detect voice information in that signal; and
initiating the prerecorded announcement when said voice information is detected, said monitoring step comprising the steps of:
periodically sampling the signal on said telephone line;
identifying the largest sample in a predetermined number of adjacent samples;
calculating the ratio of the energy of said largest sample to an energy value which is equal to the average of the energies of each of said predetermined number of adjacent samples; and
preventing performance of said initiating step unless said ratio is greater than a predetermined minimum ratio.

7. The method defined in claim 6 wherein each successive predetermined number of adjacent samples comprises a group of samples, and wherein said step of preventing comprises the steps of:
recording whether or not, for each of a plurality of successive groups of samples, said step of calculating the ratio produces a ratio that is greater than said predetermined minimum ratio; and
allowing performance of said initiating step only when said recording step indicates that said ratio is greater than said predetermined minimum ratio for at least a predetermined minimum number of the groups in said plurality of successive groups of samples.

8. The method defined in claim 6 wherein said monitoring step further comprises the steps of:
measuring the energy in said predetermined number of adjacent samples, the result being a measured energy;
comparing said measured energy to a predetermined minimum energy; and
preventing performance of said initiating step unless said step of comparing said measured energy indicates that said energy is greater than said predetermined minimum energy.

9. The method defined in claim 8 wherein each successive predetermined number of adjacent samples comprises a group of samples, and wherein said method further comprises the steps of:
recording whether or not, for each of a plurality of successive groups of samples, said step of calculating the ratio produces a ratio greater than said predetermined minimum ratio and said step of comparing said measured energy indicates that said measured energy is greater than said predetermined minimum energy; and
allowing performance of said initiating step only when said recording step indicates that said ratio is greater than said predetermined minimum ratio and said measured energy is greater than said predetermined minimum energy for at least a predetermined minimum number of the groups in said plurality of successive groups of samples.

10. The method of operating a voice processing system which includes means for automatically placing a telephone call to a user of the system and making a prerecorded announcement when that call is answered, said method comprising the steps of:
monitoring the signal on the telephone line on which said call has been placed in order to detect voice information in that signal; and
initiating the prerecorded announcement when said voice information is detected, said monitoring step comprising the steps of:
periodically sampling the signal amplitude on said telephone line;
identifying the largest sample in a predetermined number of adjacent samples;
comparing the energy of said largest sample to an energy value which is equal to the average of the energies of said predetermined number of adjacent samples; and
preventing performance of said initiating step unless said comparing step indicates that said energy of said largest sample is sufficiently greater than said energy value, said comparing step comprising the steps of:
computing the square of said amplitude of said largest sample;
computing the average of the squares of said amplitudes of said predetermined number of adjacent samples; and
determining whether the ratio of the square of said amplitude of said largest sample to the average of the squares of said amplitudes of said predetermined number of adjacent samples is greater than a predetermined minimum ratio.

11. Apparatus for detecting voice signal information in a telephone signal comprising:
means for periodically sampling said telephone signal;
means for identifying the largest sample in a group of a predetermined number of adjacent samples;
means for computing the ratio of the square of the magnitude of said largest sample and the average of the squares of the magnitudes of the samples in said group;
means for comparing said ratio to a predetermined minimum ratio; and
means for producing a voice indicating output signal only if said ratio is greater than said predetermined minimum ratio.

12. The apparatus defined in claim 11 wherein said group is one of a plurality of similarly processed successive groups, and wherein said apparatus further comprises:
means for producing a voice detection output signal if said voice indicating output signal is produced for at least a predetermined number of the groups in said plurality of similarly processed successive groups.

13. The apparatus defined in claim 11 further comprising:
- means for measuring the energy contained in the samples in said group; and
- means for comparing said energy to a predetermined minimum energy, wherein said means for producing produces said voice indicating output signal only if said energy is also greater than said predetermined minimum energy.

14. The apparatus defined in claim 13 wherein said group is one of a plurality of similarly processed successive groups, and wherein said apparatus further comprises:
- means for producing a voice detection output signal if said voice indicating output signal is produced for at least a predetermined number of the groups in said plurality of similarly processed successive groups.

15. The apparatus defined in claim 13 wherein said means for measuring comprises:
- means for computing the sum of the squares of the magnitudes of the samples in said group.

* * * * *